United States Patent [19]

Lucas et al.

[11] 4,039,834

[45] Aug. 2, 1977

[54] THERMOLUMINESCENT $CaF_2$ (TM) AND METHOD FOR ITS USE

[75] Inventors: Arthur C. Lucas, Chagrin Falls; Robert H. Moss, Cleveland Heights; Barbara M. Kapsar, Parma, all of Ohio

[73] Assignee: The Harshaw Chemical Company, Cleveland, Ohio

[21] Appl. No.: 539,654

[22] Filed: Jan. 9, 1975

[51] Int. Cl.² .............................................. G01T 1/11
[52] U.S. Cl. .................................................. 250/337
[58] Field of Search .............................. 250/337, 484; 252/301.2 R

[56] References Cited

U.S. PATENT DOCUMENTS

| 3,141,973 | 7/1964 | Heins et al. | 250/484 |
| 3,652,854 | 3/1972 | Wheeler | 250/484 |
| 3,761,710 | 9/1973 | Yamashita et al. | 250/484 UX |
| 3,775,614 | 11/1973 | Winn et al. | 250/337 |
| 3,786,254 | 1/1974 | Yamashita et al. | 250/337 |
| 3,883,748 | 5/1975 | Nada et al. | 250/484 |

Primary Examiner—Davis L. Willis
Attorney, Agent, or Firm—Alfred D. Lobo

[57] ABSTRACT

A method is disclosed for the use of thulium doped calcium fluoride in the form of a thermoluminescent dosimeter to measure the amount of radiation to which the dosimeter has been exposed.

A new thermoluminescent material for use in a dosimeter is also disclosed. The material consists essentially of crystalline calcium fluoride doped with less than 0.5 mole percent thulium. The material has several unique properties, and displays two well separated glow maxima which permit using a lower temperature (150° C) peak as a thermometer to determine a mean ambient temperature for the dosimeter. The mean ambient temperature may then be used to correct thermoluminescent data for a high temperature (250° C) peak.

8 Claims, 3 Drawing Figures

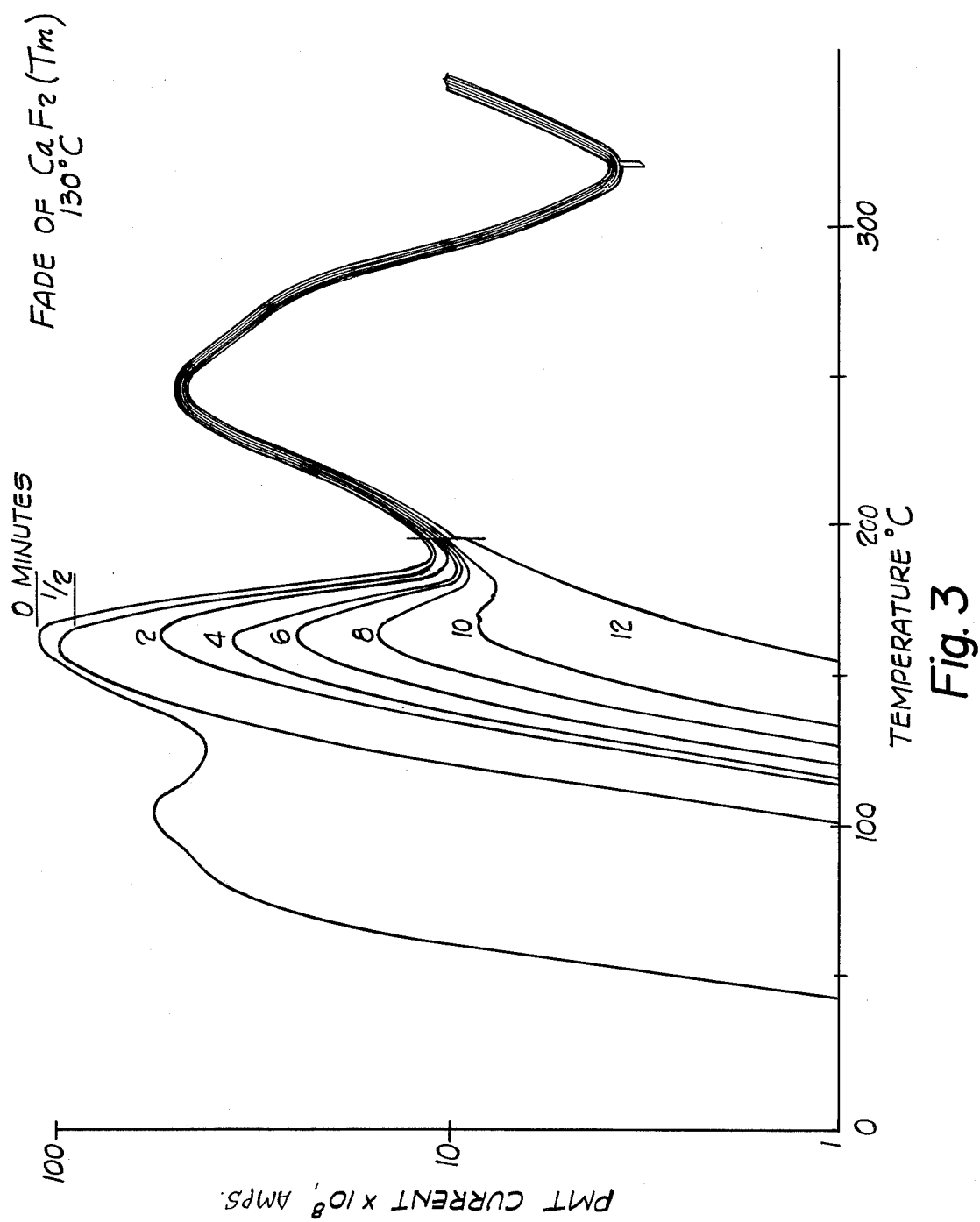

THERMOLUMINESCENT CAF$_2$ (TM) AND METHOD FOR ITS USE

BACKGROUND OF THE INVENTION

This invention relates to the manufacture and use of a thulium doped calcium fluoride, CaF$_2$(Tm), thermoluminescent material, having relatively widely separated glow maxima and, to a method for measuring the amount of radiation to which an object or person carrying a dosimeter made from the material, has been exposed.

A thermoluminescent material is one which emits or is emitting light as it is heated. A thermoluminescable material is one which may be rendered thermoluminescent — but the terms are used more or less interchangeably in this specification, and the term thermoluminscent is generally favored because it is conventionally used in the art.

Workers in a radiation environment, as a precaution against being exposed to more radiation than can be safely tolerated, either intentionally or otherwise, carry a device such as a badge, which records the amount of radiation to which the badge, and the person wearing it, have been exposed.

Thermoluminescable powders in the form of thermoluminescable dosimeters are preferred materials for such a badge because they absorb radiation by trapping it. At a much later time, say at the end of a week, the accumulated absorbed radiation is measured by heating a thermoluminescable dosimeter in a badge to a predetermined temperature at which it emits light of an intensity correlatable to the amount of radiation accumulated. Instruments, known as readers or readout systems, are available in which an exposed dosimeter is heated and the amount of light emitted is measured in scale units. The scale units are correlated to indicate the intensity of radiation in roentgens to which the material was exposed. After a thermoluminescent dosimeter is "read" it may be reused. Though existing instruments may be used to evaluate an exposed CaF$_2$(Tm) dosimeter, the method of evaluating the novel dosimeters is unique.

Though the conventional method of reading an exposed thermoluminescent dosimeter gives acceptable results, the properties of known thermoluminescent materials are such that they are difficult to read in the presence of neutrons. Another drawback is that they fade in the environment and this "fade" is difficult to evaluate because of a lack of data on the temperature history of the dosimeter being read. Even where the presence of neutrons is not a problem, and the dosimeter has a known temperature history, conventional materials do not permit an accurate determination of an accumulation of plural, very low readings. The instant CaF$_2$(Tm) provides a solution to all the foregoing problems associated with conventional materials.

Numerous thermoluminescent materials are known, many of which are disclosed in U.S. Pat. No. 3,532,777. Among the known materials are lithium fluoride doped with magnesium and titanium and calcium fluoride doped with lithium cryolite and lithium fluotitanate. Neither material has well-separated glow maxima.

Calcium fluoride is also disclosed in U.S. Pat. No. 3,203,899 as a laser or maser host material for numerous dopands of rare earth metals and transition elements, singly or in combination. Such a doped host material is taught to provide a material for amplifying microwave energy by stimulated emission of radiation (maser) and for amplifying light energy by stimulated emission of radiation (laser). A useful maser or laser material is characterized by an essentially instantaneous transfer of energy which amplified the signal introduced into the material; in other words, the lifetime of the trapped energy is exceedingly short, in the order of microseconds or nanoseconds. In contrast, the lifetime of a "trap" in a thermoluminescent material is generally several hours of days, and preferably at least 1 week. Thus it will be apparent to one skilled in the art that a material suitable for a maser or laser will be wholly unsuited as a thermoluminescent material for a dosimeter, and of course, one would not except to look for, or find, a thermoluminescent material among laser or maser materials.

It should also be noted that much effort has been devoted to the formulation of thermoluminsecent materials and a large number of host materials have been doped or activated with a comparably large list of dopands or activators. Exceedingly few of the materials have been found to possess desirable thermoluminescent properties. The work has served to emphasize that there is no predictable interchangeability of activators for host materials. Neither does there seem to be any guide as to the manner in which activators work. Thus, though there is not much question as to the ability to incorporate at least a small amount of any desired activator in almost any preselected host material, there is no reasonable expectation that a useful thermoluminescent material will result.

The novel thermoluminescent material of this invention, and the method of utilizing thulium doped calcium fluoride, provides a long-awaited solution to difficult problems of dosimetry.

SUMMARY OF THE INVENTION

A method has been discovered which permits the measurement of absorbed radiation in a CaF$_2$(Tm) thermoluminescent dosimeter under conditions, and with a degree of precision not heretofore possible.

It is therefore a general object of this invention to provide a method for measuring radiation absorbed by a CaF$_2$(Tm) thermoluminescent dosimeter made from a material displaying plural, well-separated glow maxima.

It is a specific object of this invention to provide a method for measuring radiation absorbed by calcium fluoride artifically doped with from about 0.1 to about 0.5 mole percent thulium, which yields a thermoluminescent material having plural glow maxima; two glow maxima are well-separated, one occuring at approximately 150° C and the other at approximately 250° C.

It is another specific object of this invention to provide a method which utilizes a glow maximum at one temperature as a thermometer to determine the mean ambient temperature for the dosimeter.

It is still another specific object of this invention to measure the exposure received by a dosimeter independent of the time and history of the dosimeter during and after exposure.

It has also been discovered that a material thought to have a short-lived "trap" characteristic of a maser or laser material is in fact a thermoluminescent material with a very long-lived trap.

It is therefore a general object of this invention to provide a strongly thermoluminescent material which emits in a relatively narrow band near 450 $\mu$(microns).

It is a specific object of this invention to provide a CaF$_2$ (Tm) thermoluminescent material in which low level measurements as low as 0.1mR (milliroentgen) may be made reproducibly with acceptable accuracy, yet, high levels in excess of 1 MR (Megaroentgen) may also be made.

It is also a specific object of this invention to provide a thermoluminescent doesimeter capable of simultaneously determining gamma ray and neutron exposure to this material.

It is a further specific object of this invention to provide a thermoluminescent dosimeter capable of measuring neutron exposure with accuracy because the neutron response of the traps is different from the response of the traps to gamma radiation.

A novel and unobvious method has been discovered to utilize the unique characteristics of a CaF$_2$ (Tm) dosimeter, comprising obtaining separate multiple readouts for a trap at a first temperature, and thereafter obtaining a single readout for another trap at a second sufficiently higher temperature, which single readout is essentially unaffected by heating at the first temperature.

It is therefore a general object of this invention to provide a method for determining the level of radiation to which a CaF$_2$ (Tm) dosimeter has been exposed comprising making separate multiple measurements for absorption at about 150° C and making a single cumulative measurement for absorption at about 250° C.

It is a specific object of this invention to provide a method for measuring gamma radiation in the presence of neutrons and simultaneously determining the level of gamma radiation exposure and neutron exposure, so that the accuracy of measurement of one is essentially independent of the accuracy of measurement of the other.

These and other objects, features and advantages of this invention will become apparent to those skilled in the art from the following description of preferred embodiments thereof and the illustrations set forth herein.

BRIEF DESCRIPTION OF THE DRAWINGS

The unique characteristics of the thermoluminescence of CaF$_2$ (Tm) are illustrated in the accompanying drawings, wherein:

FIG. 3 illustrates several "accelerated-fade" glow curves for CaF$_2$ (Tm) derived from plotting PMT current in nanoamperes as a function of temperature, ° C.

DETAILED DESCRIPTION OF PREFERRED EMBODIMENTS OF THE INVENTION

A dosimeter of interest in the method of this invention depends on the fact that a thermoluminescent material will store energy in the form of trapped electrons when exposed to ionizing radiation, such as gamma and X-rays. When irradiated thermoluminescent material is heated to a temperature substantially below that of incandescence, the stored electrons are released from their traps to give a luminescent glow. Since the number of electrons trapped is proportional to the intensity of the ionizing radiation, the intensity of the luminescent glow is observed with a photosensitive device such as a photomultiplier tube and the glow peak noted. Either the height of the glow peak or the area under the glow peak can be used as the measure of the radiation dose.

A typical laboratory apparatus for obtaining a glow curve is schematically illustrated in U.S. Pat. No. 3,282,855. A typical commercial instrument which is widely used is the TL Detector Dosimeter Identifier, Model 2271 made by the Crystal and Electronic Division of the Harshaw Chemical Company, wherein a glow curve is obtained by increasing the temperature of an exposed dosimeter at a known linear rate and recording the intensity of light output as a function of temperature.

Where a material is available which has plural glow maxima at different temperatures, and the rate of light emission is low at a temperature between the glow maxima, each glow maximum may be instrumented separately. The fade of the first peak will depend upon the temperature at which the dosimeter is stored, more strongly than the second peak. Thus, by measuring the relative heights of the peaks, one may calculate a correction applicable to the height of the second peak, which makes the measurement of the exposure received by a dosimeter independent of the time and history of the sample during and after exposure. This method of measuring thermoluminescence is of especial advantage for low level radiations in the natural environment. Particularly when the temperature at which the second glow maximum appears is so low that there is essentially no incandescence, it becomes possible to measure weak radiations produced in the environment to which the dosimeter was exposed.

Figure 1:
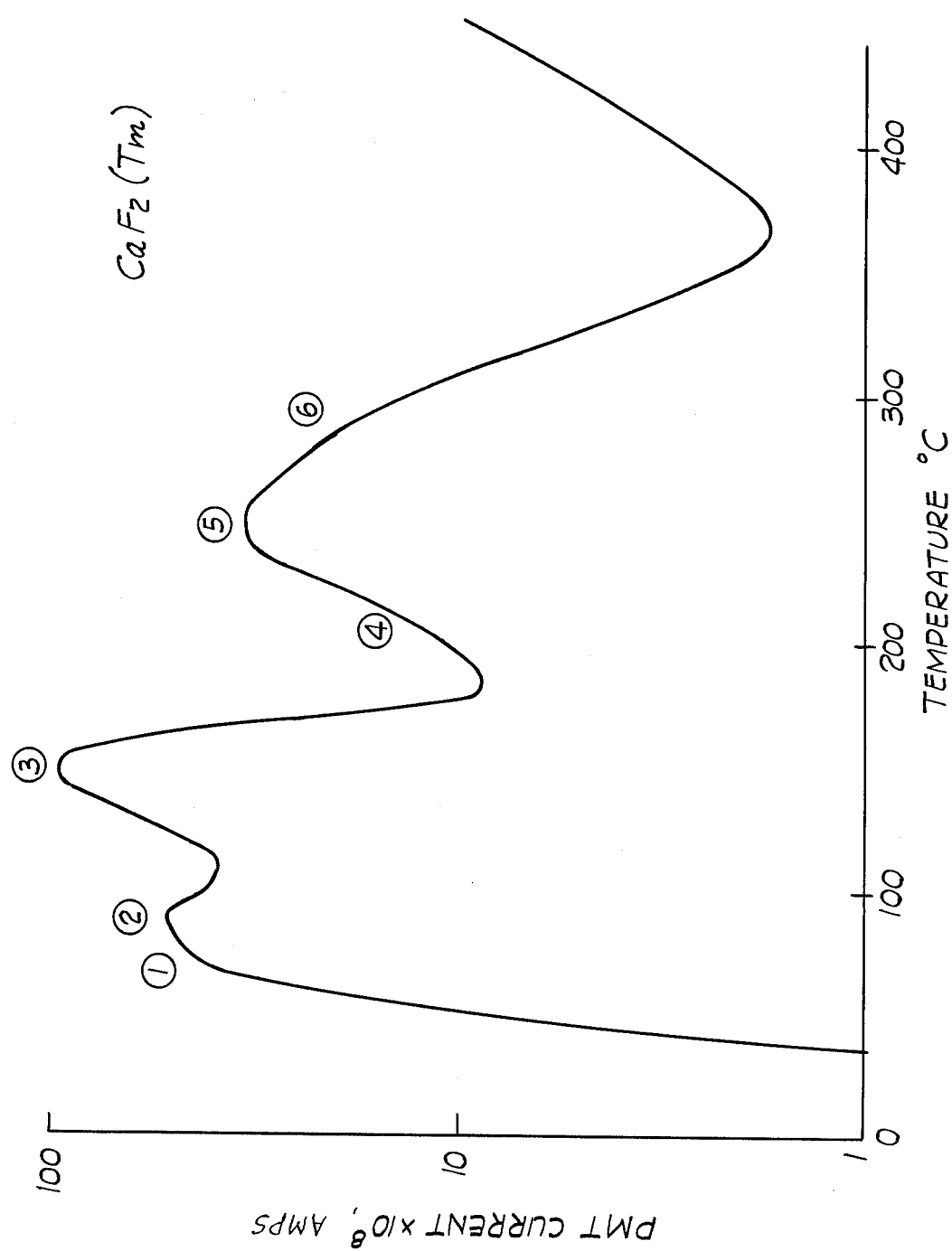
FIG. 1 is a glow curve for CaF$_2$ (Tm) derived from plotting photomultiplier tube (PMT) current, or peak current, in nanoamperes as a function of temperature.° C.

A typical glow curve for CaF$_2$ (Tm) is illustrated in FIG. 1 as a function of temperature. The photomultiplier tube (PMT) current is indicated on a logarithmic scale in amperes × 10$^8$, since the current recorded is measured in nanoamperes. The numerals 1 through 6 placed next to the glow curve indicate various trapping levels or "traps" which are characteristic of the material. Traps 3 and 5, occurring at about 150° C and 250° C, respectively, are the ones which are instrumented.

A unique characteristic of trap 3 is that it fades slightly at normal ambient temperatures in the range from about 20° C to about 30° C. However, significant fade does not occur over a period of several weeks. A more unique characteristic of trap 5 is that it is essentially insensitive to ambient temperatures as high as 100° C. The combination of these unique characteristics of CaF$_2$ (Tm) is the basis for a method of evaluating a dosimeter, independently of temperature history as will be more fully described hereinafter.

Figure 2:
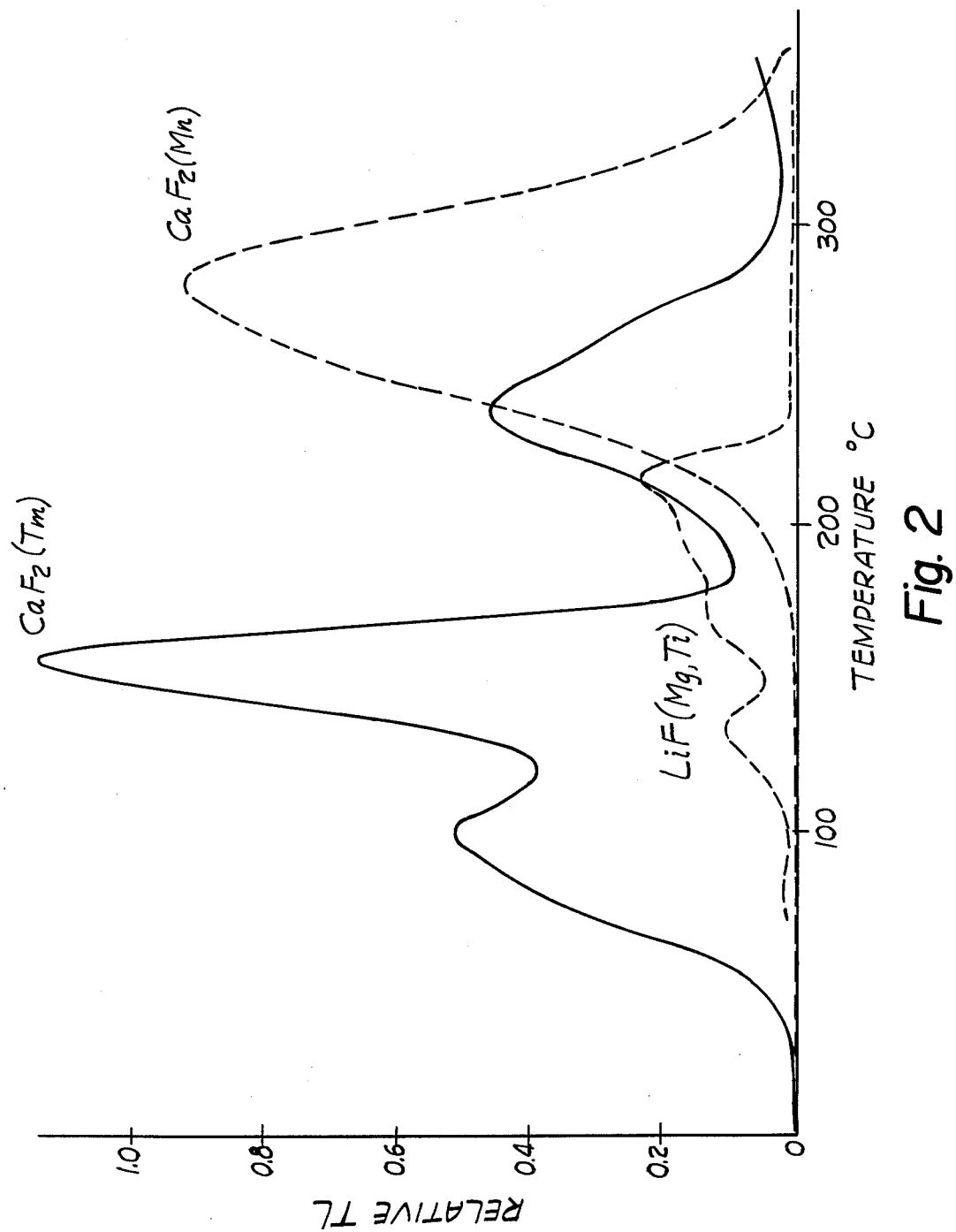
FIG. 2 illustrates glow curves for CaF$_2$ (Tm), CaF$_2$ (Mn) and LiF (Mg, Ti) derived from plotting relative thermoluminescence (relative TL) as a function of temperature, ° C.

Referring now to FIG. 2 there is shown a glow curve for CaF$_2$ (Tm) along with glow curves for the known thermoluminescent materials CaF$_2$ (Mn) and LiF (Mg, Ti). The curves show the relative thermoluminescence of each material as a function of temperature. Referring particularly to the curve for CaF$_2$ (Tm) it is seen that a first peak indicated at 2 (corresponding to trap 2) occurs at about 100° C, and a second peak indicated at 3 (corresponding to trap 3) occurs at about 150° C. Since trap 2 fades very quickly, it is presently impractical to instrument these peaks separately, and, for the purpose of this method, not trap 2 but trap 3 is measured. A third peak indicated at 5 (corresponding to trap 5) occurs at about 250° C.

It will be noted that trap 5 is relatively widely separated from trap 3 and the rate of light emission at temperatures between traps 3 and 5 is small, so that it is possible to instrument the peaks separately. The wide separation between traps 2 and 3 allows the construction of an instrument which heats a dosimeter to a temperature just sufficient to release the light attributable to the first maximum (traps 1 and 2 together) without materially affecting the absorbed energy stored in the second glow maximum. The dosimeter may then re-exposed to ionizing radiation and the thermoluminescence from the first maximum again measured. After several such cycles the instrument may be reset so as to heat the material to a temperature beyond the second glow maximum and a readout proportional to the sum of the previous determination may be obtained.

Unlike other known thermoluminescent materials trap 3 or $CaF_2(Tm)$ is highly sensitive. It displays much greater thermoluminescence at a temperature as low as about 150° C. For example, the glow curve for lithium fluoride doped with magnesium and titanium, LiF (Mg, Ti), shown in FIG. 2, displays a glow maximum having about one-fifth the peak height of trap 3 of $CaF_2(Tm)$. Moreover, LiF (Mg, Ti) is prone to fade more rapidly than $CaF_2(Tm)$ even at a temperature in the range from about 20° to about 30° C, and the maximum thermoluminescence is exhibited at about 200° C. Thus a reading of a LiF (Mg, Ti) dosimeter is not independent of the immediate past temperature history of the dosimeter. Still another known material, calcium fluoride doped with manganese, $CaF_2(Mn)$ displays a single glow maximum at about 300° C, and therefore cannot be independent of the immediate past temperature history of the dosimeter.

Reverting now to the unique characteristics of traps 3 and 5 in $CaF_2(Tm)$, there is shown in FIG. 3 an accelerated test for the fade of $CaF_2(Tm)$ at 130° C, a temperature substantially higher than any normally encountered in an environment to be monitored. This elevated temperature of 130° C was chosen to accelerate the fade of trap 3, and each curve is identified with a numeral indicating the duration (in minutes) of exposure of the dosimeter to the 130° C temperature. The glow curves are plotted as a function of temperature, and the peak current (PMT current) is measured in nanoamperes. It will be evident that the glow curve for 0 minutes in FIG. 3 corresponds to the glow curve shown in FIG. 1.

An examination of curves for exposures of ½, 2, 4, 6, 8, 10 and 12 minutes indicates that trap 3 is essentially faded after 12 minutes, but that in each instance, trap 5 is essentially unaffected. Thus, in a method where traps 3 and 5 are separately instrumented, or are read separately, as long as there is some evidence of trapping in trap 3, it is conclusively demonstrated that trap 5 has not faded. Admittedly if trap 3 has faded completely then the method of evaluating both peaks will not indicate whether trap 5 has faded. Since there is little likelihood of total trap 3 fade at normally encountered ambient temperatures, concern over the fade of trap 5 is academic.

The glow curves shown should not be interpreted as a measure of the sensitivity or total light output of the phosphors per unit of exposure, but rather as a comparison between materials under identical conditions of light-collection efficiency, system efficiency and gain, particle size and the mass of the phosphor.

From the foregoing it will be evident that a $CaF_2$ (Tm) dosimeter has an ability to retain information as trapped electrons over an extraordinary length of time even at temperatures substantially higher than room temperature. Tests indicate that there is no detectable loss of information over several months even at temperatures in the range from about 20° to about 30° C.

A dosimeter may be formed from a mass of small crystals which are either compressed or extruded as taught in U.S. Pat. No. 3,532,771 to Stewart et al. Alternatively, a powder may be used, but the use of encapsulated powders has well-known disadvantages. Still another form of dosimeter is a piece or chip cut from a single crystal. The manner in which a dosimeter of $CaF_2$ (Tm) is formed, is not critical, and any known form of dosimeter may be used. A preferred form is a small chip from about 2 mm. to about 1 cm. square, in size, suitably encapsulated.

The particular manner in which the chip is mounted or encapsulated for evaluation of the amount of radiation to which the chip is exposed is not critical because $CaF_2$ (Tm) is relatively stable in humid air. For optimum results encapsulating a dosimeter chip in a sealed enclosure containing an inert gas such as nitrogen or argon, is preferred. The enclosure is preferably formed by heat sealing in a synthetic resinous material unreactive with the dosimeter, which resinous material does not display significant spurious thermoluminescence and which is essentially completely light permeable, that is, transparent to light emitted by the phosphor.

A $CaF_2$ (Tm) dosimeter can be made sufficiently sensitive to encompass the health physics range and more, while maintaining a linear response. This dosimeter may be used in the range from about 1 to about 100 (mR) milliroentgens, and beyond to several MR, particularly if appropriately shielded in accordance with known techniques.

The manner in which thulium is introduced into the calcium fluoride lattice is well-known to those skilled in the crystal growing art and will vary depending upon the manner in which the crystal is grown. A preferred manner is to mix a predetermined amount of thulium fluoride with the calcium fluoride before an ingot is melt-grown, for example, by either the Stockbarger or Kyropoulos methods. A preferred amount of thulium for doping the calcium fluoride is in the range from about 0.1 to about 0.5 mole percent thulium.

The following examples are illustrative of the method of evaluating a $CaF_2$ (Tm) dosimeter.

EXAMPLE 1

A method for measuring low level exposure by multiple readouts for trap 3, and checking with a single readout for trap 5 is illustrated as follows:

Consider the case of a worker in a low level gamma radiation environment whose dosimeter is read each day to detect possible over exposure. Such overexposure may occur accidentally when the worker chances upon a high level radiation area. The plural traps of $CaF_2$ (Tm), which may be separately instrumented, permit determination of daily dosage and cumulative dosage. Though daily dosage as determined by a trap 3 readout is subject to the same experimental error as a readout for a conventional dosimeter, the cumulative dosage is more accurate when obtained as a trap 5 readout, as will be explained hereinbelow.

Typical readings obtained are listed hereinbelow in Table I. These readings may be obtained in a conventional reader, reading a known Li (Mg, Ti) dosimeter made as described in U.S. Pat. No. 3,320,180; or, by reading trap 3 for a CaF$_2$(Tm) dosimeter.

TABLE I

| Day | Reading (Scale Units) |
|---|---|
| 1 | 0.6 ± 0.5 |
| 2 | 0.5 ± 0.5 |
| 3 | 0.9 ± 0.5 |
| 4 | 4.2 ± 0.5 |
| 5 | 0.4 ± 0.5 |
| 6 | 0.6 ± 0.5 |
| 7 | 2.1 ± 0.5 |
| 8 | 0.8 ± 0.5 |
| 9 | 1.2 ± 0.5 |
| 10 | 0.6 ± 0.5 |
| Sum | 11.9 ± 5.0 |

As will be apparent, where a reading is low, the magnitude of the error is comparable to the reading itself. Thus, the true exposure of the worker at the end of the 10th day may have been as low as 6.9, and, as high as 16.9 scale units, irrespective of the material being CaF$_2$(Tm) or LiF (Mg, Ti).

If the dosimeter used is a CaF$_2$(Tm) dosimeter, and the above readings in Table I corresponds to "trap 3" readings at 150° C, the second maximum (trap 5) is also read out at the end of the 10th day, and is set forth hereinbelow:

TABLE II

| Day | Reading for trap 5 (Scale Units) |
|---|---|
| 10 | 4.1 ± 0.5 |

It is seen that the absolute value of the light output from trap 5 is about one-third of the sum of multiple trap 3 readings, but the total light attributable to the sum of the separate expsoures is sufficiently large that better accuracy is obtained.

The peculiarity of about a one-third light output for trap 5 in comparison with the light output of trap 3 may be compensated for by proper calibration, for example, by exposing a CaF$_2$(Tm) dosimeter to a known level of gamma radiation, say 100 mR, and reading both traps 3 and 5, which might be found to read 300 and 100 scale units respectively.

One then calculates that, within the limits of error, the sum of the readings at the end of ten days is 4.0 ± 1.7 mR corresponding to 11.9 ± 5.0 scale units.

As stated in Table II, the single reading for trap 5 at the end of 10 days is 4.1 ± 0.5 mR.

Though the 4.0 mR result obtained by separate daily readings of either CaF$_2$(Tm) trap 3, or LiF (Mg, Ti) is essentially the same as the 4.1 mR result of cumulative dosage read, the latter is more precisely determined. Yet, the daily readings have the advantage of determining an overexposure very soon after it is experienced.

EXAMPLE II

Measurement of gamma radiation dosage and neutron dosage simultaneously.

This measurement is possible because the response of CaF$_2$(Tm) traps 3 and 5 to neutrons is not the same as their response to gamma radiation. Moreover trap 3 is substantially insensitive to exposure to fast neutrons and trap 5 is more sensitive. Therefore, with proper calibration, one may calculate exposure to both gamma rays and neutrons from two measurements of glow peak height obtained from a single sample, which readings are R$_3$ and R$_5$ corresponding to traps 3 and 5. Each reading consists of two components, namely, the gamma ray response and a very small neutron response. Thus, $$R_3 = AG + BN \ldots (1)$$

and $$R_5 = CG + DN \ldots (2)$$

wherein $G$ represents the gamma ray dose $N$ represents the neutron dose, and $A$, $B$, $C$, and $D$ are constants.

The constants $A$, $B$, $C$ and $D$ are determined by calibration of the system. Constants $A$ and $C$ may be determined with a single gamma ray exposure and the constants $B$ and $D$ may be determined with a single exposure to a neutron source having few emitted gamma rays. A solution of the equations (1) and (2) for the values of $G$ and $N$, yields:

$$G = \frac{DR_3 - BR_5}{AD - BC}$$

and $$N = \frac{AR_5 - CR_3}{AD - BC}$$

We claim:

1. A radiation dosimeter comprising a phosphor consisting essentially of calcium fluoride activated with thulium present in the range from about 0.1 mole percent to about 0.5 mole percent.

2. A radiation dosimeter comprising a hermetically sealed envelope enclosing an environment which is inert, said envelope being essentially transparent to light emitted by a phosphor sealed therewithin, said phosphor consisting essentially of calcium fluroide activated with thulium.

3. The radiation dosimeter of claim 2 wherein said thulium is present in the range from about 0.1 to about 0.5 mole percent.

4. A method for measuring the total amount of plural small doses of radiation to which at least a single thermoluminescable dosimeter of calcium fluoride activated with thulium is exposed comprising making separate measurements of thermoluminescence at a first temperature for each of said plural doses at a first glow maximum of said dosimeter, and thereafter making another measurement of thermoluminescence at a second glow maximum at a second temperature separated from said first temperature so that said another measurement is essentially unaffected by measurements made at said first temperature.

5. The method of claim 4 wherein said first temperature is about 150° C and said second temperature is about 250° C.

6. A method for measuring the amount of radiation to which a thermoluminescable dosimeter having plural glow maxima is exposed comprising making a first measurement of thermoluminescence at a first glow maximum of said dosimeter at a first temperature, making a second measurement of the thermoluminescence at a second glow maximum of said dosimeter at a second temperature higher than said first temperature, measuring a means ambient temperature for said dosimeter, and utilizing said mean ambient temperature to correct said second measurement.

7. The method of claim 6 wherein said thermoluminescable dosimeter is calcium fluoride activated with thulium, said first temperature is about 150° C and said second temperature is about 250° C.

8. A method for simultaneously measuring the amount of gamma radiation and neutrons to which a thermoluminescable dosimeter is exposed comprising making a first measurement of thermoluminescence at a first glow maximum corresponding to trap (3) of calcium fluoride activated with thulium, thereafter making a second measurement of thermoluminescence at a second glow maximum corresponding to trap (5) of $CaF_2$ (Tm), on the same sample, and determining by calibration the constants applicable to the gamma ray and neutron components of said first and second measurements, to indicate simultaneoulsy the level of gamma radiation and neutron irradiation to which said dosimeter has been exposed.

* * * * *